No. 747,725. PATENTED DEC. 22, 1903.
M. KALABA & F. GAILER.
TOOL HEATING HANDLE.
APPLICATION FILED MAY 6, 1903.
NO MODEL.
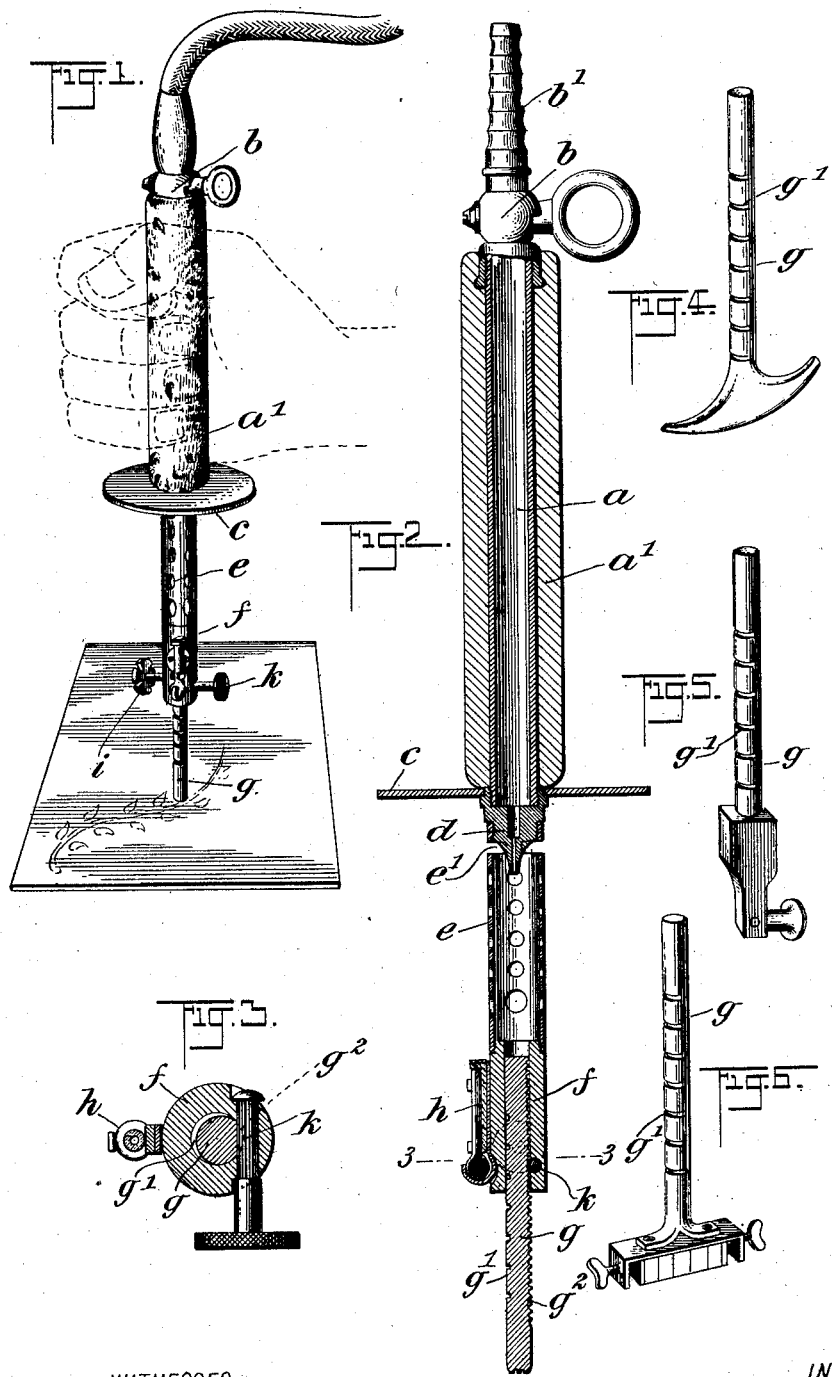
WITNESSES:
INVENTORS
Moritz Kalaba
Ferdinand Gailer
BY
ATTORNEYS.
THE NORRIS PETERS CO., PHOTO-LITHO., WASHINGTON, D. C.

No. 747,725. Patented December 22, 1903.

UNITED STATES PATENT OFFICE.

MORITZ KALABA, OF NEW ROCHELLE, AND FERDINAND GAILER, OF NEW YORK, N. Y.

TOOL-HEATING HANDLE.

SPECIFICATION forming part of Letters Patent No. 747,725, dated December 22, 1903.

Application filed May 6, 1903. Serial No. 155,861. (No model.)

*To all whom it may concern:*

Be it known that we, MORITZ KALABA, a resident of New Rochelle, in the county of Westchester, and FERDINAND GAILER, a resident of the city of New York, borough of Manhattan, in the county of New York, State of New York, citizens of the United States, have invented a new and Improved Tool-Heating Handle, of which the following is a full, clear, and exact description.

This invention relates to a handle especially adapted for bookbinders' tools, by which handle the tool may be heated continually, this being effected by providing burner devices and supplying gas thereto through a flexible tube.

Ordinarily bookbinders' tools are provided each with a handle to which the tools are permanently fastened and the tools are heated by a stove or like means. This has many disadvantages. Aside from the time which is lost in going to and from the stove is the disadvantage due to the uncertain heating of the tool—that is, it can never be determined just what is the temperature of the tool. The tool is frequently taken from the stove either excessively or not sufficiently heated, and bad work necessarily results from either condition.

Our invention enables us not only to keep the tool continuously heated, but to keep it heated at a uniform and any desired temperature. It also provides for interchanging the tools at will, so that a single handle will do for any number of tools.

This specification is an exact description of two examples of our invention, while the claims define the actual scope thereof.

Reference is to be had to the accompanying drawings, forming a part of this specification, in which similar characters of reference indicate corresponding parts in all the views.

Figure 1 is a perspective view showing the handle in use. Fig. 2 is an enlarged longitudinal section of the same. Fig. 3 is an enlarged cross-section on the line 3 3 of Fig. 2; and Figs. 4, 5, and 6 are views of several tools, all of which are intended to be used with the invention.

Referring to Figs. 1, 2, and 3, the handle proper is formed of a tube $a$, covered with cork or other non-conducting substance $a'$. Said tube $a$ is provided at its upper end with a valve $b$ and a ribbed nozzle $b'$, adapted to be engaged with a flexible pipe, so that air may be continuously supplied to the tube $a$. At the opposite end of the handle proper a shield $c$, of leather or other material, is secured, this serving to protect the hand from heat at the burner. The burner comprises a nozzle $d$, communicating with the tube $a$ and discharging into a mixing-tube $e$, which is perforated throughout its length and provided at the end adjacent to the tube $a$ with a large perforation $e'$, which serves for the inlet of the air used in the burner. At its lower end the mixing-tube $e$ carries a sleeve $f$, in which the tools (indicated at $g$ in the drawings) are held. The sleeve $f$ also carries a thermometer $h$, which is attached to the outer side of the tube to indicate the heat at this point. The tools $g$ are intended to be adjustably held in the sleeve $f$. This may be done either by a set-screw $i$ or by a pinion $k$, or both. In case the set-screw is employed the tools should preferably be formed with grooves $g'$ therein to allow effective engagement between the set-screw and the tool, and if the pinion $k$ is employed the tool should be formed with rack-teeth $g^2$, as indicated in Figs. 2 and 3, these teeth meshing with the pinion and enabling the tool to be shifted longitudinally at will. Both the set-screw and pinion are mounted in the sleeve $f$.

In the operation of the tool after opening the valve $b$ and lighting the gas as it issues from the nozzle $d$ the gas will burn in the tube $e$ with a blue flame, and thus highly heat the inner end of the sleeve $f$. This heat will be transmitted to the tool, and therefore as long as the burner is in operation the tool will be heated. Clearly by moving the tool in and out in the sleeve $f$ the former may be brought nearer to or farther from the flame, and thus the heat of the tool may be easily regulated. The heat may also be regulated by adjusting the valve $b$. The thermometer $h$ enables the exact temperature of the tool to be taken at any time desired, and the operator once fixing in his mind the necessary heat will be able readily to keep the tool at the proper temperature.

Various changes in the form, proportions, and minor details of our invention may be resorted to at will without departing from the spirit and scope thereof. Hence we consider ourselves entitled to all such variations as may lie within the intent of our claims.

Having thus described our invention, we claim as new and desire to secure by Letters Patent—

1. A handle, comprising a handle proper, a burner, a sleeve juxtaposed to the burner, means for adjustably holding a tool in the sleeve, and a thermometer attached to the sleeve.

2. A handle, comprising a handle proper, a burner, means for adjustably holding a tool juxtaposed to the burner, and a thermometer also juxtaposed to the burner.

3. A handle, comprising a tubular handle proper, a burner at one end thereof communicating therewith, means for adjustably holding a tool adjacent to the burner, and a thermometer mounted adjacent to the burner.

4. A handle comprising a handle proper, a burner, means for holding a tool juxtaposed to the burner, and a thermometer also juxtaposed to the burner.

5. A handle, comprising a tubular handle proper adapted to communicate with a source of gas-supply, a burner-nozzle at one end of the handle proper, a perforated mixing-tube projecting longitudinally from said end of the handle proper and into which the nozzle discharges, and means for holding a tool longitudinally in the said mixing-tube and for permitting the axial adjustment of the tool toward and from the burner-nozzle.

6. A handle, comprising a tubular handle proper adapted to communicate with a source of gas-supply, a burner-nozzle at one end of the handle proper, a perforated mixing-tube projecting longitudinally from said end of the handle proper and into which the nozzle discharges, and means for holding a tool longitudinally in the said mixing-tube and for permitting the axial adjustment of the tool toward and from the burner-nozzle, said means comprising a sleeve fastened to the mixing-tube and a movable member mounted in the tube and having connection with the tool, to adjust the same.

7. A handle, comprising a tubular handle proper adapted to communicate with a source of gas-supply, a burner-nozzle at one end of the handle proper, a perforated mixing-tube projecting longitudinally from said end of the handle proper and into which the nozzle discharges, and means for holding a tool longitudinally in the said mixing-tube and for permitting the axial adjustment of the tool toward and from the burner-nozzle, said means comprising a sleeve fastened to the tube and a pinion mounted to turn in the sleeve and adapted to mesh with corresponding teeth on the tool, to adjust the same.

In testimony whereof we have signed our names to this specification in the presence of two subscribing witnesses.

MORITZ KALABA.
FERDINAND GAILER.

Witnesses:
G. NEWMAN,
LOUIS SCHMIDT.